United States Patent [19]

Hasegawa et al.

[11] Patent Number: 5,995,318
[45] Date of Patent: Nov. 30, 1999

[54] HEAD POSITIONING CONTROL SYSTEM FOR DISK DRIVES EACH FORMED BY ASSEMBLING DISKS AFTER SERVO CONTROL INFORMATION IS WRITTEN EXTERNALLY ON RESPECTIVE DISKS AND DISK DRIVE

[75] Inventors: Susumu Hasegawa; Yukihiro Uematsu; Keiji Aruga; Shuichi Hashimoto; Kazuhiko Takaishi, all of Kawasaki, Japan

[73] Assignee: Fujitsu Limited, Kawsaki, Japan

[21] Appl. No.: 08/821,165

[22] Filed: Mar. 20, 1997

[30] Foreign Application Priority Data

Sep. 20, 1996 [JP] Japan ................................ 8-250208

[51] Int. Cl.$^6$ ........................................................ G11B 5/55
[52] U.S. Cl. ...................................... 360/78.14; 360/78.04
[58] Field of Search ............................. 360/77.04, 77.05, 360/77.08, 78.04, 78.06, 78.07, 78.14

[56] References Cited

U.S. PATENT DOCUMENTS

| | | |
|---|---|---|
| 4,135,217 | 1/1979 | Jacques et al. . |
| 4,149,199 | 4/1979 | Chick et al. . |
| 4,530,020 | 7/1985 | Sutton . |
| 4,536,809 | 8/1985 | Sidman . |
| 4,616,276 | 10/1986 | Workman . |
| 4,628,379 | 12/1986 | Andrews, Jr. et al. . |
| 5,109,306 | 4/1992 | Mase et al. ............................ 360/77.04 |
| 5,109,502 | 4/1992 | Sasamoto et al. ....................... 395/425 |
| 5,402,280 | 3/1995 | Supino ................................. 360/77.04 |
| 5,729,718 | 3/1998 | Au ........................................ 360/48 X |
| 5,760,993 | 6/1998 | Purkett ................................. 360/78.08 |
| 5,859,742 | 1/1999 | Takaishi ................................ 360/78.01 |

FOREIGN PATENT DOCUMENTS

| | | |
|---|---|---|
| 56-47932 | 4/1981 | Japan . |
| 57-212666 | 12/1982 | Japan . |
| 62-47882 | 3/1987 | Japan . |
| 62-60749 | 12/1987 | Japan . |
| 3189972 | 8/1991 | Japan . |
| 5334817 | 12/1993 | Japan . |
| 773614 | 3/1995 | Japan . |

*Primary Examiner*—Aristotelis M. Psitos
*Assistant Examiner*—James L. Habermehl
*Attorney, Agent, or Firm*—Greer, Burns & Crain, Ltd.

[57] ABSTRACT

Disclosed is a head positioning control system for disk drives which enables fast access even when eccentricities of tracks defined with servo control information relative to the center of rotation are different among disks assembled after the servo control information is externally written on the respective disks. The head positioning control system is adapted to a disk drive comprising a plurality of disks each having a record surface on which servo control information indicating positions in a radial direction on a disk is recorded, and heads associated with the plurality of disk record surfaces and designed to detect information stored on the plurality of disk record surfaces. The servo control information includes position information in the radial direction on each disk record surface and defines servo-control circular trajectories. In addition to known components, the head positioning control system includes an eccentric information memory for storing eccentric information concerning eccentricities of servo-control circular trajectories on disk record surfaces relative to the center of rotation, and an optimal processing unit that when object disk record surfaces are changed according to an instructed target address, executes processing, which requires the shortest time for accessing a target address, on the basis of eccentric information.

13 Claims, 15 Drawing Sheets

HEAD POSITIONING CONTROL SYSTEM FOR DISK DRIVES EACH FORMED BY ASSEMBLING DISKS AFTER SERVO CONTROL INFORMATION IS WRITTEN EXTERNALLY ON RESPECTIVE DISKS AND DISK DRIVE

BACKGROUND OF THE INVENTION

1. Field of the Invention

The present invention relates to a magnetic disk drive and a head positioning control method for magnetic disk drives. More particularly, this invention is concerned with a head positioning control system and control method for magnetic disk drives which enables fast seek and gives control readily even when servo-control circular trajectories defined with servo control information recorded on the surfaces of disks do not match with a rotational circular trajectory because of eccentricities of the disks.

2. Description of the Related Art

In recent years, there has been the trend toward higher recording densities for the purpose of increasing the storage capacity of magnetic disk drives. A faster access speed is also requested. Various methods have been proposed to increase the storage capacity of a magnetic disk drive and improve the access speed thereof.

A magnetic disk drive (hereinafter a disk drive) stores data as magnetic patterns on magnetic disks (hereinafter disks) using magnetic heads (hereinafter heads), and reads data by detecting an electrical signal in a head caused by a recorded magnetic pattern. For specifying a position at or from which data is stored or read, magnetic guides referred to as tracks are formed concentrically with the center of rotation of each disk as a center. A position in a radial direction is identified by detecting a track. Each track is divided in a circumferential direction into a plurality of segments referred to as sectors. Sector numbers indicating circumferential position thereof are magnetically recorded on each disk. Data storage is carried out in units of a sector.

In a disk drive in which a plurality of disks are fitted on the same axis of rotation and heads are placed on the record surfaces of the disks, a control method referred to as a servo-control surface servo-control method is adopted. This control method is, for example, such that: the heads are interlocked with one another and moved; one of the disk surfaces is regarded as a servo-control surface, and information concerning tracks and sectors is recorded on the servo-control surface; and the other disk surfaces are regarded as data surfaces on which data alone is recorded. However, in the servo-control surface servo control method, the displacement of a head on a data surface relative to a head on a servo-control surface leads to a positional error of the head relative to the position of written data. The positional error cannot be reduced very much because of a temperature change or vibration of a head moving mechanism. It is therefore difficult to sufficiently narrow track width and thus improve recording density. In recent years, data has been recorded on all disk surfaces. Information concerning a sector and information concerning a track are recorded at the start of each sector on each disk surface, and detected in order to control the position of a head. Moreover, signals indicating sectors are magnetically recorded on a disk. The magnetic data concerning sectors is read in order to identify a sector.

In an existing disk drive, disks are fitted on the axis of rotation of a spindle motor, magnetic heads are attached to an actuator, and then the disks and magnetic heads are assembled within a housing. Thereafter, the housing is mounted on a servo track writer (STW), so that servo control information (including track numbers and sector numbers) can be written while the actuator inside the disk drive is being moved by means of an actuator installed outside the disk drive and controlled to be positioned highly precisely. After this processing is completed, it becomes possible to move the actuator for writing or reading data. Tracks are therefore concentric trajectories with the center of rotation as a center. The same applies to data surface servo control and servo-control surface servo control. However, in reality, since the heads or spindle motor vibrates while data is being written along a track, the track is not a complete circle but includes vibrations relative to a circular trajectory. For improving the recording density of a disk drive, it is required to narrow the track width and increase the number of tracks that can be formed on a disk. However, if a track vibrates, there is the fear that adjoining tracks may interfere with each other. The track width cannot therefore be narrowed so drastically. This obstructs improvement of a recording density.

The present inventor has determined that a recording density might be improved by forming tracks accurately on disks using an external apparatus and then assembling the disks by fitting them on an axis of rotation. As long as tracks are merely formed, it is unnecessary to take account of an access speed or the like. Tracks can be formed more accurately using a dedicated head. Consequently, track width can be reduced and recording density can be raised. Currently, for writing servo control information, a head is attached to a swinging suspension and used for the writing. In an external apparatus, the head attached to the swinging suspension is regarded as a head assembly that hardly swings and is used for writing servo control information. Thus, the number of tracks on each disk is increased. Consequently, high-density recording of data can be achieved. However, when disks having tracks formed are fitted on the axis of rotation of a spindle motor, even if the fitting precision is improved, it is unavoidable that the centers of the tracks are not aligned with the center of rotation and the tracks become eccentric to some extent. It is conceivable that adjustment is carried out in order to alleviate eccentricities. However, very delicate adjustment is needed. It is very hard to carry out adjustment until sufficient precision is attained. Even if such adjustment is possible, there arises a problem that too much man power is required for the adjustment and this leads to an increase in cost.

According to the data surface servo control method for a plurality of disk surfaces, only a head engaged in writing or reading data should be controlled for tracking. Feedback is carried out so that a head to be controlled can track the center of a track. For changing a head to be controlled to another, a standby state is retained until the new head tracks a target track. After the head is controlled to track the center of the target track, data writing or reading is carried out. This poses a problem that after heads are changed, a long access time ensues.

SUMMARY OF THE INVENTION

An object of the present invention is to realize a magnetic disk drive and head positioning control method for magnetic disk drives which enable fast access even if tracks defined with servo control information are eccentric relative to the center of rotation.

A head positioning control system of the present invention is adapted to a disk drive comprising a plurality of disks each having a record surface on which servo control information indicating positions in a radial direction on a disk surface is recorded, and heads associated with the plurality of disk record surfaces and designed to detect information recorded on the plurality of disk record surfaces. Servo information includes position information in a radial direction on each disk record surface and servo-control circular trajectories. The head positioning control system of the present invention includes known components as well as an eccentric information storing means for storing eccentric information concerning eccentricities of the servo-control circular trajectories on disk record surfaces relative to the center of rotation, and an optimal processing means that, when object disk record surfaces are changed according to an instructed target address, executes processing to require the shortest time for accessing the target address on the basis of the eccentric information.

Head change optimal processing is, for example, processing that requires the shortest time as a seek time needed to track a target track corresponding to a target address after quitting a current track that is tracked when the target address is instructed. It is judged whether or not a rotational trajectory of a current track being tracked when the target address is instructed crosses a rotational trajectory of the target track corresponding to the target address. If the tracks cross each other, it is judged whether or not the tracks cross each other within a rotation wait time ending at the time instant at which a sector of the track corresponding to the target address is accessed for the first time. If the tracks do not cross each other, it is judged whether or not the target track can be sought within the rotation wait time. If the target track can be sought, the processing of seeking the target track may be determined as optimal processing. In any other case, the processing of tracking the current track until the two tracks cross each other and then tracking the target track when the two tracks cross each other may be determined as optimal processing.

Allocation of physical addresses and logical addresses is preferably such that: one of a plurality of disk record surfaces is regarded as a reference surface; tracks on other disk record surfaces, which cross given sectors of tracks on the reference surface, are provided with the same physical track numbers as the corresponding tracks on the reference surface; and consecutive logical track numbers are allocated to the tracks bearing the same physical track numbers.

A head positioning control method for disk drives in accordance with the present invention is such that when object heads (disk surfaces) are changed, a difference between eccentricities of disk record surfaces is taken into account. According to the head positioning control method for disk drives of the present invention, a step of detecting eccentric information concerning a difference between eccentricities of servo-control circular trajectories on disk record surfaces relative to the center of rotation and a corresponding difference between positions of heads, and a step of storing the eccentric information are carried out first. These steps may be carried out in the final stage before delivery from a factory, or they may also be carried out automatically periodically. Thereafter, the following steps are carried out successively: a step at which when a target address is instructed, it is judged whether or not object disk record surfaces are changed according to the target address, and in which, when object disk record surfaces are changed, eccentric information (head change information) is input; a step of calculating a seek time needed to seek a track indicated with the target address on the basis of the relationship between an allocated physical address and logical address in consideration of the eccentric information; a step of calculating a rotation wait time ending at the time instant at which a sector indicated with the target address comes; a step of determining processing, which requires the shortest time for accessing the target address after changing heads, as optimal processing on the basis of the combination of the rotation wait time and seek time; and a process of controlling a positioning of a head through the determined optimal processing.

Optimal processing is determined in the same manner as mentioned above.

A disk drive includes a plurality of disk record surfaces. Servo-control circular trajectories defined with servo-control information recorded on the disk record surfaces are eccentric. The magnitudes and directions of eccentricities are different among the disk record surfaces. When object disk record surfaces are changed, that is, when heads are changed, a difference between eccentricities of the disk record surfaces to be changed must be taken into account.

When heads are changed so that access can be gained to a track on a different disk record surface having the same track number or to a sector of an adjoining track, if a track on which a head is located at that time and a destination track cross each other, the heads are changed at the time of crossing. Thus, the heads can be changed without a seek movement. However, when a target sector comes before the tracks cross each other, if the target sector of the target track can be sought before the target sector comes along, seek should be executed without the wait for the crossing of the tracks. This results in a shorter access time.

Generally, in a disk drive, consecutive logical track numbers are allocated to tracks on disk surfaces having the same track number. However, if the servo-control circular trajectories on the disk surfaces become eccentric, the tracks on the disk surfaces are not aligned with one another. When consecutive logical track numbers are allocated in order to the tracks on the disk surfaces having the same track number as they are in a prior art, a seek movement becomes indispensable to the time of changing heads. In a head positioning control unit for disk drives according to the present invention, one of a plurality of disk record surfaces is regarded as a reference surface. Tracks on other disk record surfaces, which cross given sectors of the tracks on the reference surface when the tracks are seen in the direction of the axis of rotation, are provided with the same physical track numbers as the corresponding tracks on the reference surface. Consecutive logical track numbers are allocated to tracks having the same physical track numbers. Further, when heads are changed, the changing operation is carried out when the heads are at the sector. Thus, a seek movement of a head due to a difference between eccentricities of disks need not be made in the course of writing or reading consecutive logical tracks. Consequently, fast access can be realized.

BRIEF DESCRIPTION OF THE DRAWINGS

The present invention will be more clearly understood from the description as set below with reference being made to the accompanying drawings, wherein.

DESCRIPTION OF THE PREFERRED EMBODIMENTS

Before preceding to a detailed description of the preferred embodiments of the present invention, a prior art disk drive will be described with reference being made to the accompanying drawings relating thereto for a clearer understanding of the differences between the prior art and the present invention.

Figure 1:
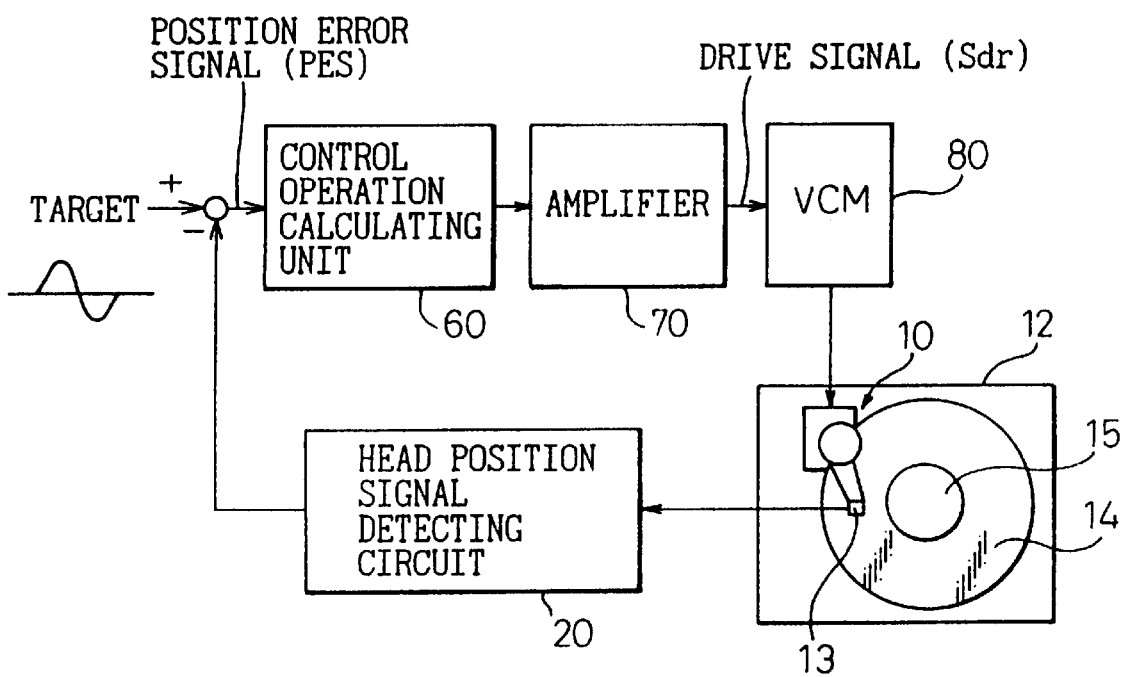
FIG. 1 is a control block diagram showing the configuration of a known head positioning control system.
Figure 2:
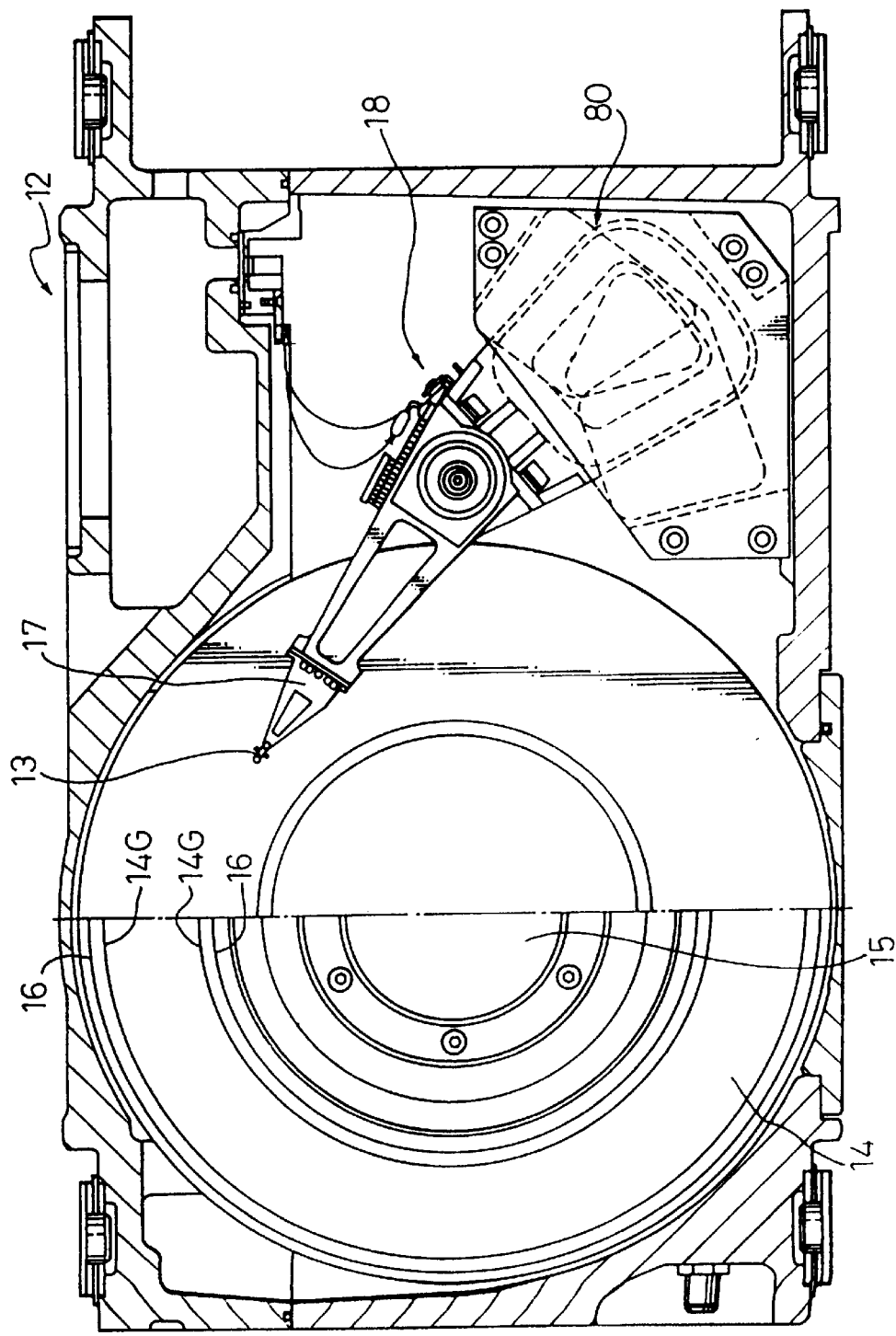
FIG. 2 is a plan view showing the structure of a general disk drive.

FIG. 1 is a control block diagram showing the configuration of a known disk drive, and FIG. 2 is a plan view showing the structure of a general disk drive.

As shown in FIGS. 1 and 2, in a disk drive, disks (normally a plurality of disks) 14 fitted on an axis of rotation of a spindle motor 15 rotate within a disk enclosure 12. Heads 13 are held at the tips of spring arms 17. When the disks 14 rotate, the heads 13 fly over the surface of the disks 14 due to an air flow. The spring arms 17 are held by carriages 18 so that the spring arms 17 can swing freely. When the spring arms 17 swing, the positions of the heads 13 in radial directions on the disks 14 change. Data recording is carried out along a concentric track with the center of rotation on the surface of each disk 14 as the center. Data writing or reading is started when a target sector comes to the position of a head 13 in a state in which the head 13 is controlled to be positioned on a target track by means of an actuator 10.

Tracks are formed magnetically. Each head 13 reads magnetic data indicating a track. Tracking is then carried out so that the head 13 can be controlled to be positioned on a target track. Signals indicating sectors are magnetically recorded on the disks 14. Each head 13 reads the magnetic data concerning sectors, and thus identifies a specific sector. There are control methods: a servo-control surface servo control method in which servo control information is thus recorded on a dedicated disk surface; and a data surface servo control method in which servo control information is recorded together with data. The present invention is concerned with the data surface servo control method.

According to the data surface servo control method, servo control information is recorded at the start of each sector of each track. A head position signal detecting circuit 20 extracts servo control information from a signal detected by a head 13, produces a signal proportional to an error of the position of the head 13 relative to a track, and inputs a reverse signal to a control operation calculating unit 60. The control operation calculating unit 60 produces a signal used to correct the error, and inputs the signal as a drive signal Sdr to a voice coil motor 80, incorporated in the actuator 10 and serving as a component of the actuator, via an amplifier 70. In response to the signal, the voice coil motor 80 moves the head 13 to the center of the track. Thus, feedback is carried out in order to position the head 13 on the target track. FIG. 1 shows only the control block for positioning a head 13 on a track. The control block is also responsible for recognizing a track number using servo control information and changing tracks by turning the arms according to the information, or for recognizing a sector number using the servo control information. A description of these control operations will be omitted.

In an existing disk drive, disks are fitted on the axis of rotation of the spindle motor 15, magnetic heads are attached to the actuator, and then the disks and magnetic heads are assembled in a housing. Thereafter, the disks are each mounted on a servo track writer (STW), so that servo control information (including track numbers and sector numbers) can be written while the actuator inside the disk drive is moved by means of an actuator installed outside the disk drive and positioned very precisely. However, this method has a drawback in that track width cannot be reduced very much. The present inventor has determined that recording density might be improved by forming tracks accurately on disks using an external apparatus and then fitting the disks on an axis of rotation and assembling them. When tracks are recorded, it is unnecessary to take account of an access speed or the like. Tracks can be formed accurately using a dedicated head. Besides, track width can be reduced and the recording density can be improved. In other words, for writing servo control information, a head attached to a swinging suspension is used. In the external apparatus, the head attached to a swinging suspension is used as a head assembly that hardly swings to form tracks. Thus, the number of tracks on each disk is increased. This enables high-density recording of data.

Figure 3:
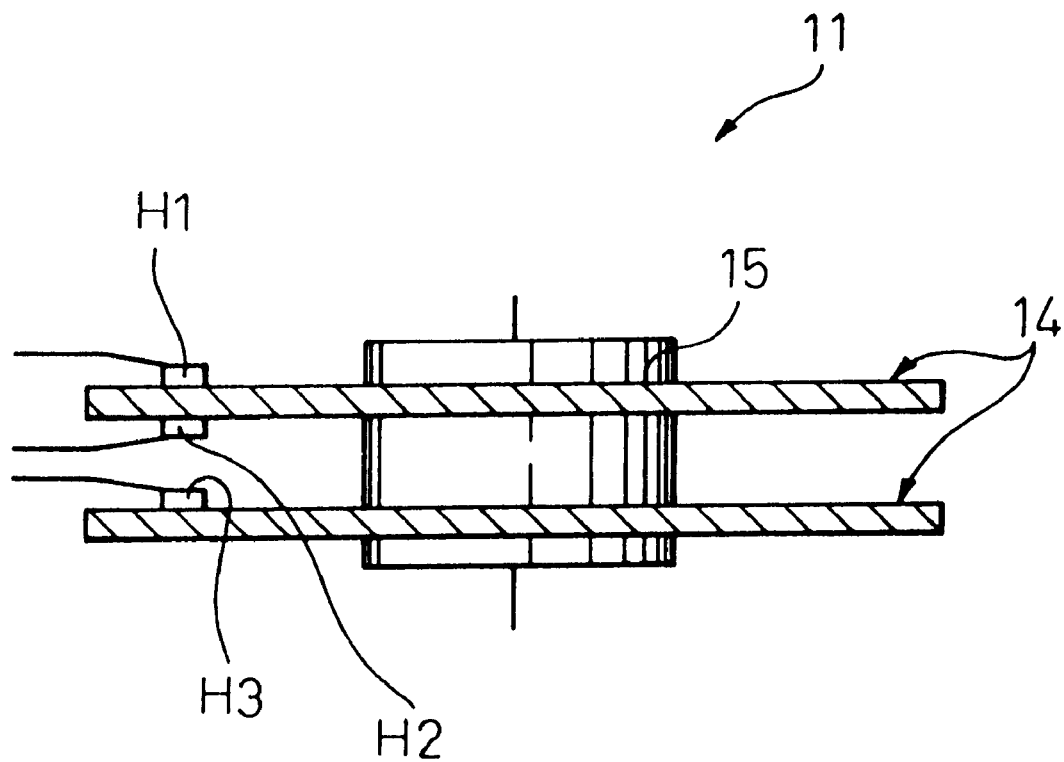
FIG. 3 is a simplified plan view illustrating the positional relationship between disks handled by a single-disk servo track writer (STW) and heads.

FIG. 3 is a simplified side view illustrating the positional relationship between disks 14, on each of which tracks are written by a single-disk STW, and heads 13.

Tracks are written on both sides of each disk 14. Thereafter, the disks 14 are fitted on the spindle motor 15 and thus assembled. Heads are placed on both sides of each disk 14. For fitting disks on which tracks are formed on the axis of rotation of the spindle motor, even if the fitting precision is improved, it is unavoidable that the centers of tracks are not aligned with the center of rotation but must become eccentric to some extent. It is conceivable that adjustment is carried out in order to alleviate the eccentricities. In this case, very delicate adjustment is required. It is very hard to attain sufficient precision through adjustment. Even if it is possible, there arises a problem that too much man power is required for the adjustment and this leads to an increase in cost.

In the data surface servo control method handling a plurality of disk surfaces, only a head engaged in writing or reading data should be controlled for tracking. Feedback is carried out so that a head to be controlled can track the center of a track. For changing a head to be controlled to another, a standby state is retained until a new head can track a target track. After the head is controlled to track the center of the target track, data is written or read. However, this method poses a problem that after heads are changed, a longer access tine ensues. A disk drive of the present invention solves this problem.

Figure 4:
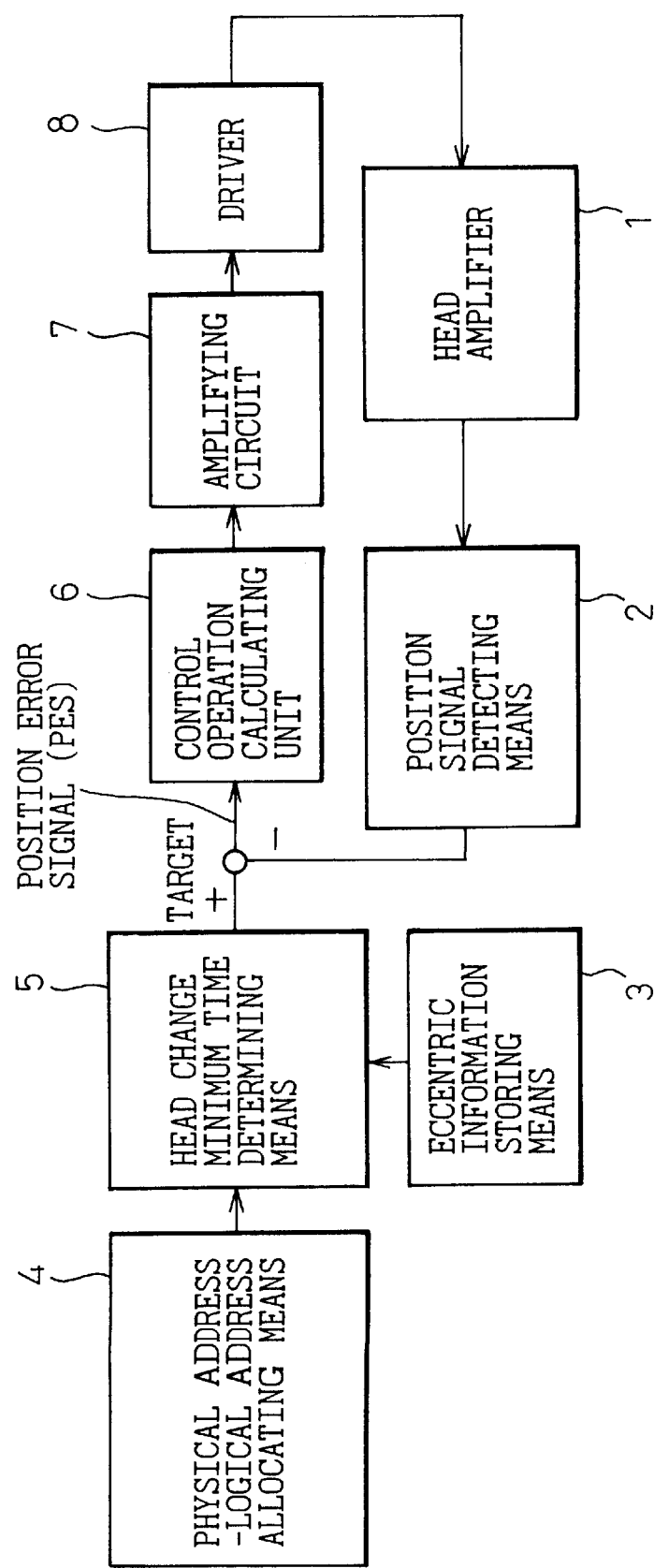
FIG. 4 is a block diagram showing the configuration of a head positioning control system based on the principles of the present invention.

FIG. 4 is a block diagram showing the configuration of a head positioning control system for magnetic disk drives based on the principles of the present invention.

A head positioning control system of the present invention is adapted to a disk drive comprising a plurality of disks each having a recording surface on which servo control information indicating positions in a radial direction on a disk is recorded, and heads associated with the plurality of disk record surfaces and designed to detect information recorded on the plurality of disk record surfaces. Servo control information is information including position information in a radial direction on each disk record surface and defining servo-control circular trajectories. As shown in FIG. 4, the head positioning control system of the present invention comprises a head position detecting means 2 for recognizing a head position using a detection signal sent from a head amplifier 1 incorporated in a head, and a head movement control means for generating a signal used to move the head. The head movement control means includes an adder subtracter for calculating a difference between a head position signal and a signal indicating a target track so as to produce a position error signal PES, a control operation calculating unit 6 for using the position error signal PES to produce a drive signal used to control a head so that the head can be positioned in the center of a target track, an amplifying circuit 7 for amplifying the drive signal, and a driver 8 for moving the head according to the drive signal. The head movement control means generates a signal for use in moving a head so as to change the distance of the position on a disk of the head from the center of rotation. A physical address/logical address allocating means 4 includes a physical address/logical address table in which physical addresses indicating positions on a plurality of disk record surfaces at which data is recorded are associated with logical addresses used to externally input or output data from or to the disk drive, and outputs a target track/sector signal according to an instructed target address. In addition to these known components, the head positioning control system of the present invention includes an eccentric information storing means 3 for storing eccentric information concerning an eccentricity in centers between the servo-control circular trajectories on the disk record surfaces, and an optimal processing means that when object disk record surfaces are changed according to an instructed target address, executes processing which provides the shortest time for accessing a target address, on the basis of eccentric information.

Figure 5:
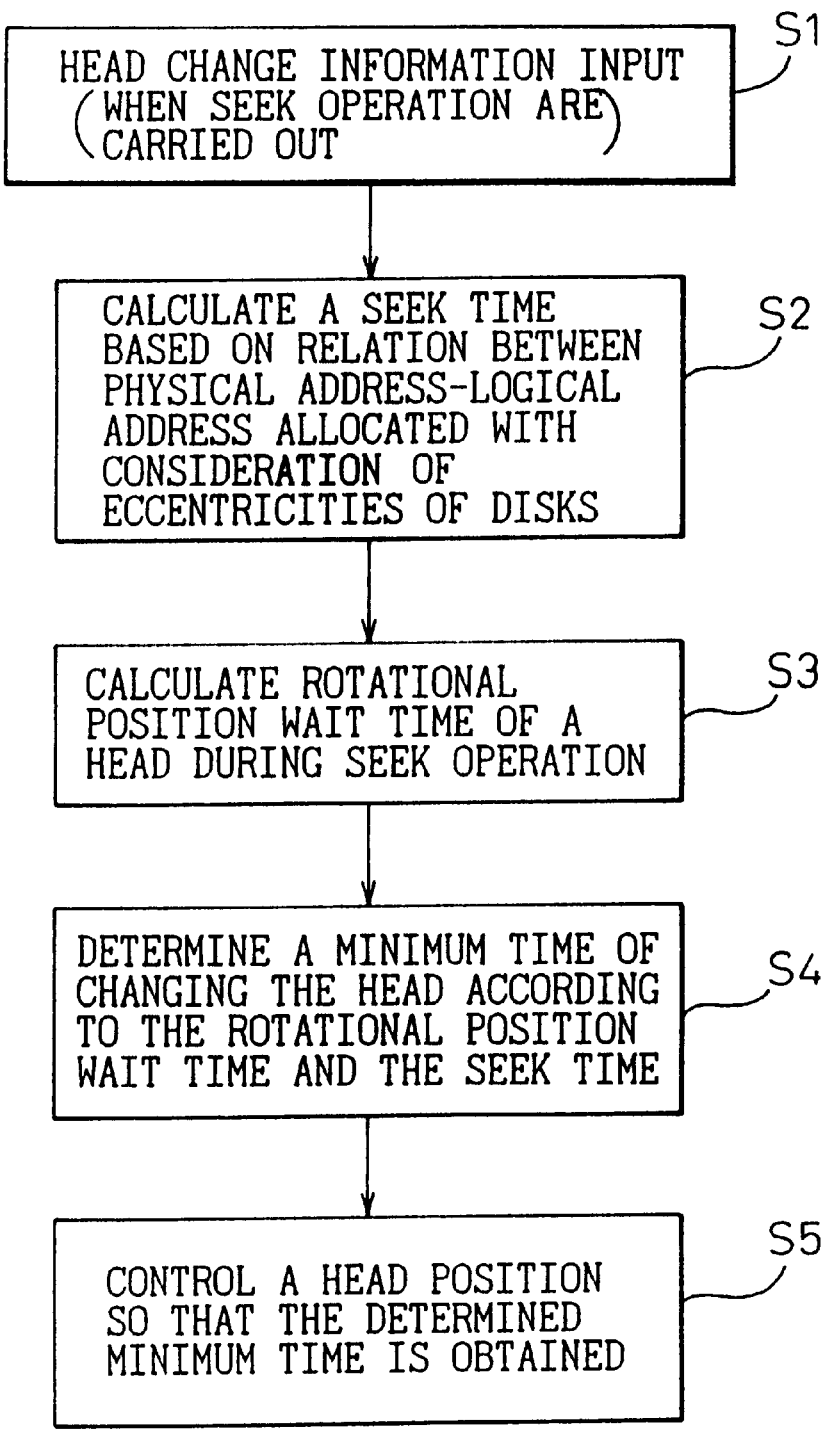
FIG. 5 is a flowchart for explaining a head positioning control method based on the principles of the present invention.

FIG. 5 is a flowchart describing a sequence followed by the head positioning control system based on the principles of the present invention.

According to a head positioning control method for disk drives in accordance with the present invention, when object heads (disk surfaces) are changed, a difference between the eccentricities of the disk record surfaces is taken into account. In other words, according to the head positioning control method for disk drives of the present invention, a step of detecting eccentric information concerning an eccentricity in centers between servo-control circular trajectories on disk record surfaces and a corresponding difference between positions of heads, and a step of storing the eccentric information are carried out first. These steps may be carried out in the final stage before delivery from a factory they may be carried out automatically periodically. Thereafter, the following steps are carried out: a step (S1) at which when a target address is instructed, it is judged whether or not object disk record surfaces are changed according to the target address, and in which, when heads are changed, eccentric information (head change information) is input; a step (S2) of calculating a seek time during which a track indicated with the target address is sought on the basis of the relationship between an allocated physical address and logical address in consideration of the eccentric information; a step (S3) of calculating a rotation wait time ending at the time instant at which a sector indicated with the target address comes along; and a step (S4) of determining processing which provides the shortest time for accessing the target address after changing heads, as optimal processing on the basis of the combination of the rotation wait time and seek time; and a step of controlling positioning of a head through the determined optimal processing.

A disk drive includes a plurality of disk record surfaces. Servo-control circular trajectories defined with servo control information recorded on the disk record surfaces are eccentric. The magnitudes and directions of eccentricities are different among the disk record surfaces. When object disk record surfaces are changed, that is, when heads are changed, a difference between eccentricities of disk record surfaces to be changed must be taken into account.

When heads are changed so that a track on a different disk record surface having the same track number can be accessed or a sector of an adjoining track can be accessed, a track on which a head is located at that time and a destination track may cross each other. In this case, when the tracks cross each other, the heads are changed. Thus, the heads can be changed without a seek movement. However, when a target sector comes before the tracks cross each other, if the target sector of the target track can be sought before the target sector comes along, a seek is executed without waiting for the crossing of the tracks. This results in a shorter access time.

Figure 6:
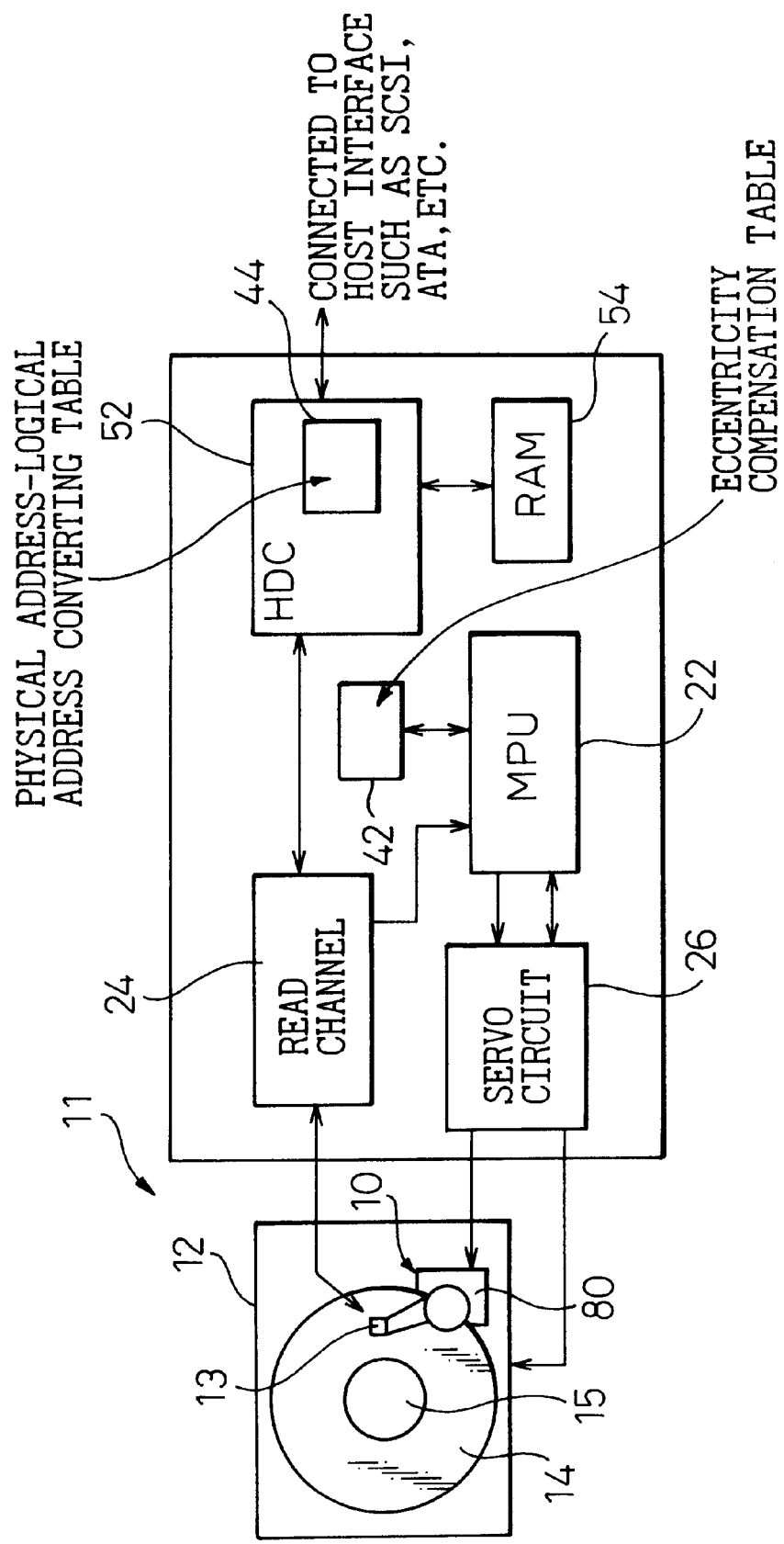
FIG. 6 is a diagram showing the fundamental configuration of a magnetic disk drive of an embodiment of the present invention.

FIG. 6 is a block diagram showing the configuration of a disk drive of an embodiment to be described below.

As shown in FIG. 6, a mechanical part of a disk drive 11 is such that disks (normally a plurality of disks) 14 fitted on an axis of rotation of a spindle motor 15 rotate inside a disk enclosure 12. When the disks 14 rotate, the heads 13 fly due to an air flow. The heads 13 are held at the tips of arms that can swing freely. The plurality of disks 14 are all fitted on the axis of rotation of the spindle motor 15 and rotate simultaneously, though they are not all illustrated. Data is recorded on both sides of each disk. A head 13 is placed on both sides of each disk. All the heads 13 are held by a common moving mechanism (actuator) 80 and moved simultaneously. Furthermore, servo control information shown in FIGS. 4 and 5 is externally recorded in advance on both sides of each disk 14. The disks are then fitted on the axis of rotation of the spindle motor 15. The mechanical part is controlled by a control unit 2.

The control unit 2 includes a microprocessor (microcomputer) 22, a read/write channel 24, a servo control circuit 26, an eccentricity compensation table 42, a hard disk controller (HDC) 52, and a RAM 54 used as a data buffer. The HDC 52 contains a physical address-logical address converting table 44. A multiplexer is used as a signal input section of the read/write channel 24, whereby any of detection signals sent from heads can be selected as an input. Whichever of a plurality of disk surfaces is selected as an object disk surface on or from which data is written or read is determined by selecting a signal sent from a specific head using the multiplexer. These components are identical to those of a known disk drive. The only difference lies in the eccentricity compensation table 42. A description of the components identical to those of the known disk drive will be omitted. The difference alone will be described below.

The eccentricity data memory 42 stores the magnitudes and directions of eccentricities of servo-control circular trajectories formed on the disks 14 relative to the center of rotation. The magnitudes and directions of eccentricities temporarily stored during initialization must be preserved until initialization is executed even if the power supply is switched off. The employment of a nonvolatile memory such as an EPROM or EEPROM is therefore preferred. Alternatively, the magnitudes and directions of eccentricities may be stored in servo control information areas on the disks 14. At the time of activation, the magnitudes and directions of eccentricities stored on the disks 14 may be read and stored in a RAM.

Figure 7:
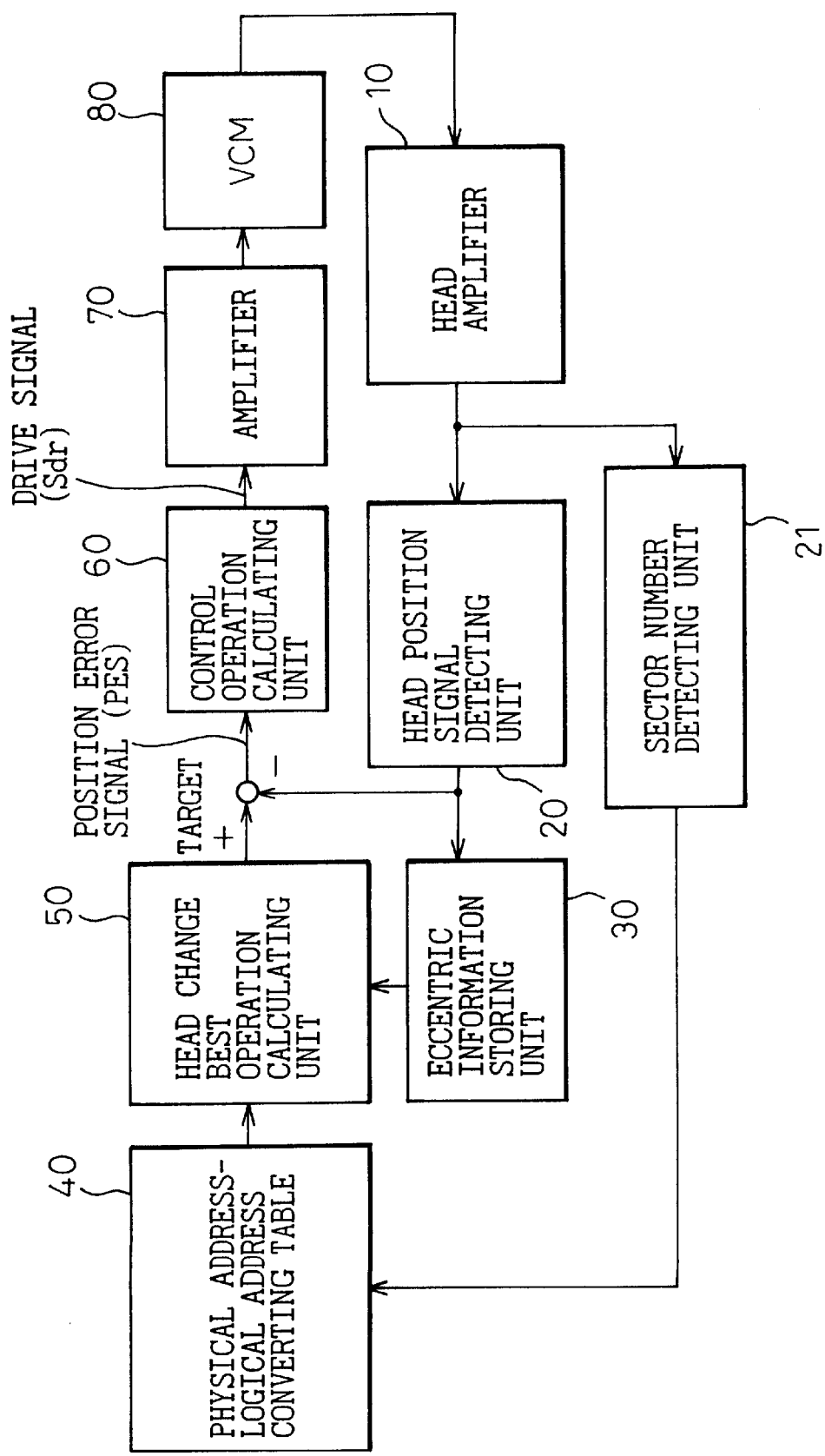
FIG. 7 is a diagram showing the fundamental configuration of a disk drive control system of an embodiment of the present invention.

FIG. 7 is a block diagram showing the configuration of the control unit of this embodiment.

As shown in FIG. 7, a head amplifier 10 amplifies magnetic data recorded on a disk 14 and detected by a head 13, and outputs the data as a detection signal. A head position detecting unit 20 recognizes servo control information recorded in a servo control information recording area on the basis of the detection signal, detects on which track a head is located, and outputs a head position signal. A sector number detecting unit 21 recognizes servo control information using the detection signal sent from the head amplifier 10, and outputs a signal indicating that a sector number will be passed soon. The sector number detecting unit 21 recognizes a sector number using the detection signal sent from the head amplifier 10. The head position signal is input to the adder subtracter that calculates a difference from a signal indicating a target track. A signal indicating the difference is a position error signal PES. The position error signal PES is input to a control operation calculating unit 60. The control operation calculating unit 60 uses the head position signal to produce a drive signal Sdr used to control a head 13 so that the head 13 can be positioned in the center of a target track, and outputs the drive signal to an amplifier 70. The drive signal Sdr is amplified by the amplifier 70, and is then applied to a voice coil motor (VCM) 80. This causes the head 13 to move. The physical address-logical address converting table 40 is a physical address/logical address table in which physical addresses indicating positions on disk record surfaces at which data is recorded are associated with logical addresses for use in externally inputting or outputting data from or to the disk drive. When a logical address is given externally, an associated physical address is retrieved from the physical address-logical address converting table 40. The physical address is then output as a target track/sector signal to the adder subtracter. The above sequence is identical to that followed by a known control unit.

Conventionally, after disks are fitted on a spindle motor and thus assembled, tracks are written simultaneously on disk record surfaces. When object disk record surfaces are changed, if a track having the same track number is accessed, a target track number need not be changed. When target tracks are changed, whether or not object disk record surfaces are changed, the same target track number should be output. However, as mentioned above, in this embodiment, tracks formed on disk record surfaces are eccentric relative to the center of rotation. Moreover, the magnitudes and directions of eccentricities are different among the disk surfaces. Therefore, when a head is controlled to be positioned conventionally, an access time that counts at the time of changing heads increases.

This embodiment further comprises an eccentric information storing unit 30 and a head change best operation calculating unit 50.

The eccentric information storing unit 30 is realized with the MPU 22 in FIG. 6. With each head 13 controlled to be set in a given state for measuring eccentric data, the eccentric information storing unit 30 detects a head position signal and a signal indicating a sector number, measures the magnitude and angular direction of an eccentricity of a track relative to the center of rotation as well as a difference of the position of the head 13 on each disk surface from that on another disk surface, and stores the results of measurement. The head change best operation calculating unit 50 determines processing optimal for changing heads 13 on the basis of the relationships of correspondence between physical addresses and logical addresses which are contained in the physical address-logical address converting table 40, and the magnitudes and angular directions of eccentricities of disk surfaces and the differences of the positions of the heads 13 from others which are stored in the eccentric information storing unit 30. The head change best operation calculating unit 50 then outputs a target track signal.

Next, the processing of measuring the magnitude and angular direction of an eccentricity of a track relative to the center of rotation will be described.

Various methods can be adopted to measure an eccentricity of a servo-control circular trajectory on each disk record surface relative to a rotational circular trajectory, and to detect differences between the magnitudes and directions of eccentricities of disk record surfaces. For example, a disk 14 is rotated with a head 13 abutted against a stationary stoppage means such as a carriage stopper. Servo-control information on the disk 14 is then detected using the head 13 for measurement. Alternatively, under a condition that the frequency band of a servo control signal is limited to a value equal to or smaller than the rotation frequency of a disk 14, the disk 14 is rotated. Servo control information on the disk 14 is then detected by a head 13, whereby an eccentricity of a servo-control circular trajectory relative to the rotational circular trajectory is measured. Otherwise, an average of values of servo control signals obtained when a head 13 is controlled to trace a servo-control circular trajectory is used to measure an eccentricity. A difference between servo-control circular trajectories due to a difference between eccentricities of disk record surfaces relative to the center of rotation are stored in relation to each sector number.

In this embodiment, the eccentric information storing unit 30 is used to measure eccentricities of disk record surfaces within the disk drive. The eccentricities may be measured using an external apparatus, and the results of the measurement may be stored in the eccentric information storing unit 30.

Next, optimal processing for changing heads when the eccentricities of servo-control circular trajectories on disk surfaces are different will be described.

Figure 8:
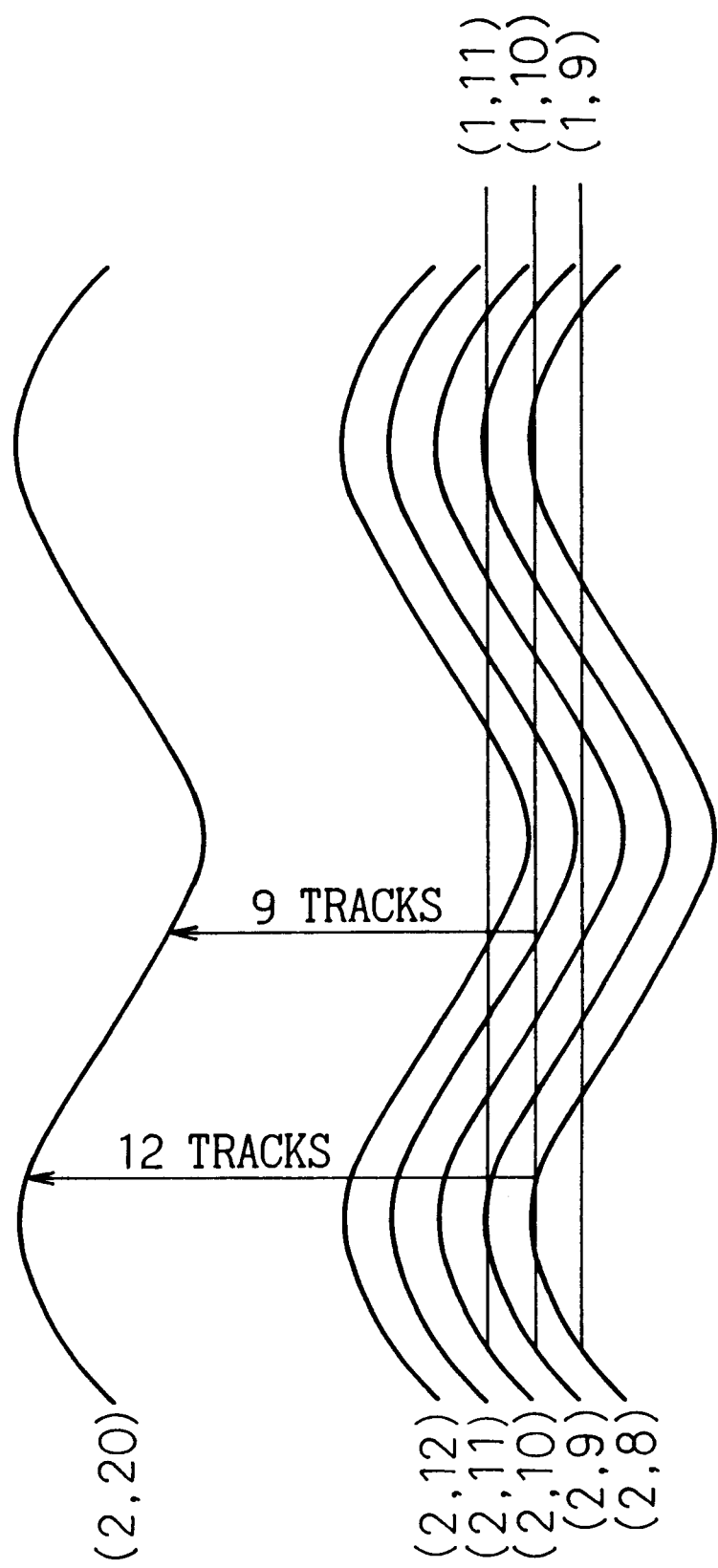
FIG. 8 is a diagram showing trajectories of tracks on the same disk surface and trajectories of tracks on another disk surface which are traced when the tracks are eccentric relative to the center of rotation and heads are tracking the tracks.

Tracks are written on disk surfaces by an STW. Because of eccentricities stemming from the writing or eccentricities stemming from fitting of disks, the positions on the tracks of heads vary in the form of a sine wave along with rotation. When a first head is controlled to track a track, tracks (1-9, 1-10, 1-11) on a first disk surface associated with the first head are seen lying parallel to one another as shown in FIG. 8. In contrast, the positions on tracks of a head on another disk surface, for example, the positions on tracks (2-9, 2-10, 2-11, etc., 2-20) of a second head on an associated second disk surface are seen varying in the form of a sine wave that vary with peaks formed equidistantly. When the first head is changed to the second head in order to change a track (1-10) on the first disk surface into a track (2-20) on the second disk surface, as shown in FIG. 5, a seek distance may be 12 tracks or 9 tracks. Assuming that a recording density is increased, tracks are written externally by the STW, and then disks are assembled, the seek distance may have values that are mutually different by several tens of tracks or several hundreds of tracks. Such a difference in seek distance deriving from a difference between eccentricities cannot be ignored. In this case, the difference between eccentricities must be taken into account in changing heads and making a seek movement.

Figure 9:
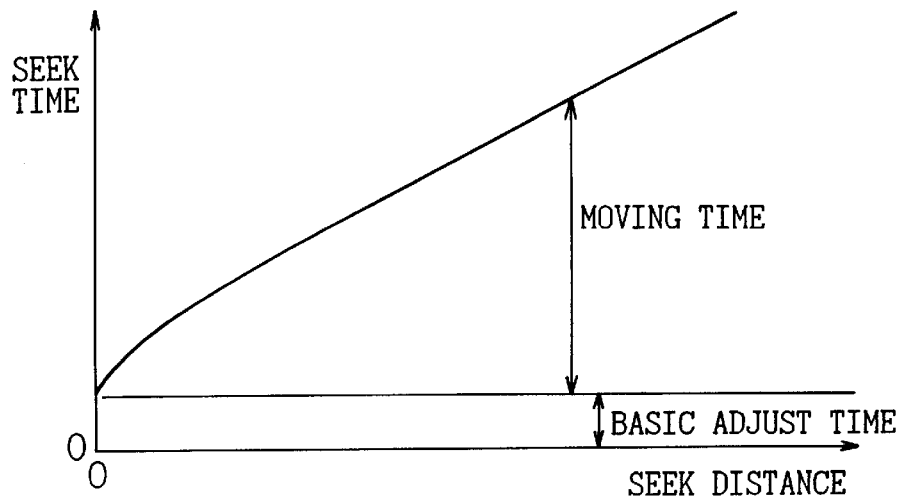
FIG. 9 is a graph illustrating the relationship between a seek distance and seek time.

Prior to the influence of eccentricities, a seek time will be discussed. The seek time generally varies, as shown in FIG. 9, depending on a seek distance. The seek time is a sum of a moving time necessary for the actuator to actually move a long distance after speed control, and a basic adjustment time needed to verify that the actuator is positioned within a tolerance of a precise target position. The larger the absolute value of a seek distance is, the longer the moving time is. The seek time can be said to increase with an increase in seek distance.

Figure 10:
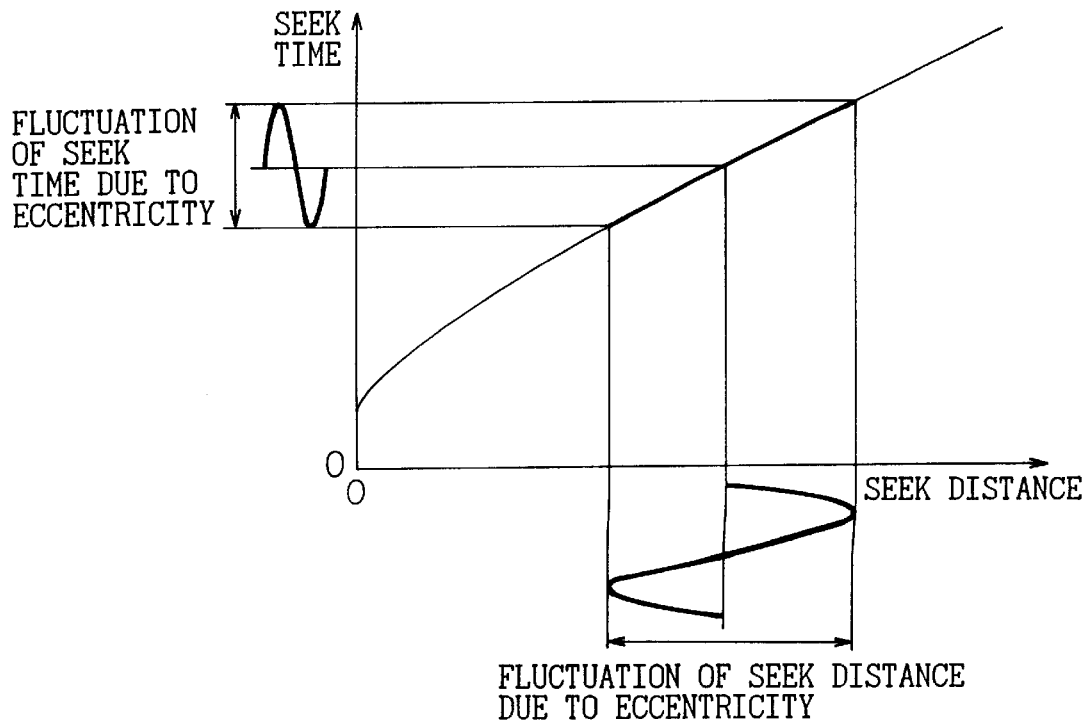
FIG. 10 is a graph illustrating a variation in seek distance due to an eccentricity.
Figure 11:
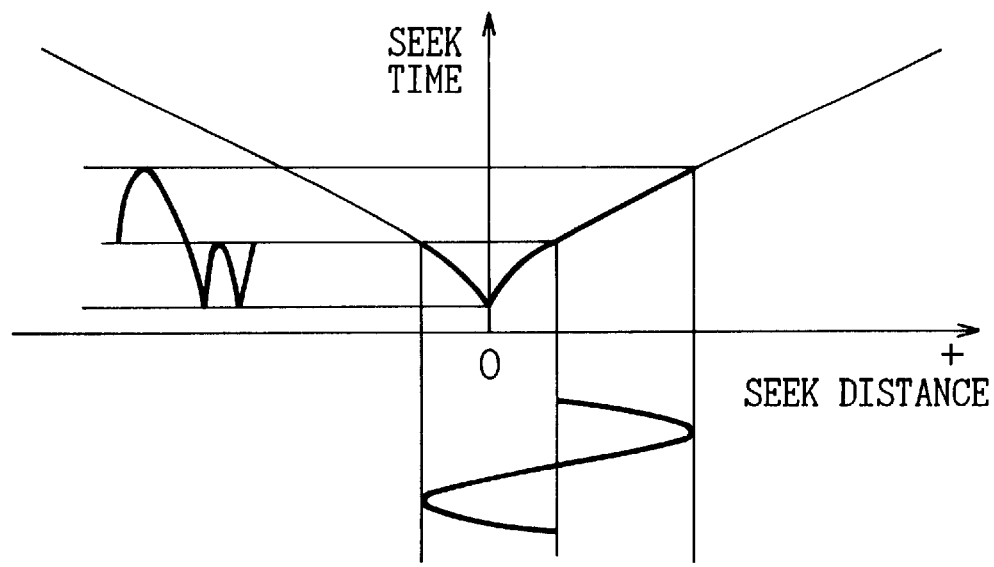
FIG. 11 is a graph illustrating a variation in seek distance due to an eccentricity occurring when a current track and target track are crossing each other.

As shown in FIG. 8, when eccentricities are present, a seek distance varies depending on the time instant at which heads are changed. FIGS. 10 and 11 are diagrams for explaining that the variation in distance leads to a variation in seek time. FIG. 10 is concerned with a situation in which a destination track is located away from a current track. In this situation, the variation in seek distance that is plotted substantially like a sine wave leads to a sine-wave variation in seek time. FIG. 11 is concerned with a situation in which a destination track crosses a current track. In this situation, a seek distance varies in both positive and negative directions. The variation in seek time is plotted like a sine wave part of which is folded.

Figure 12:
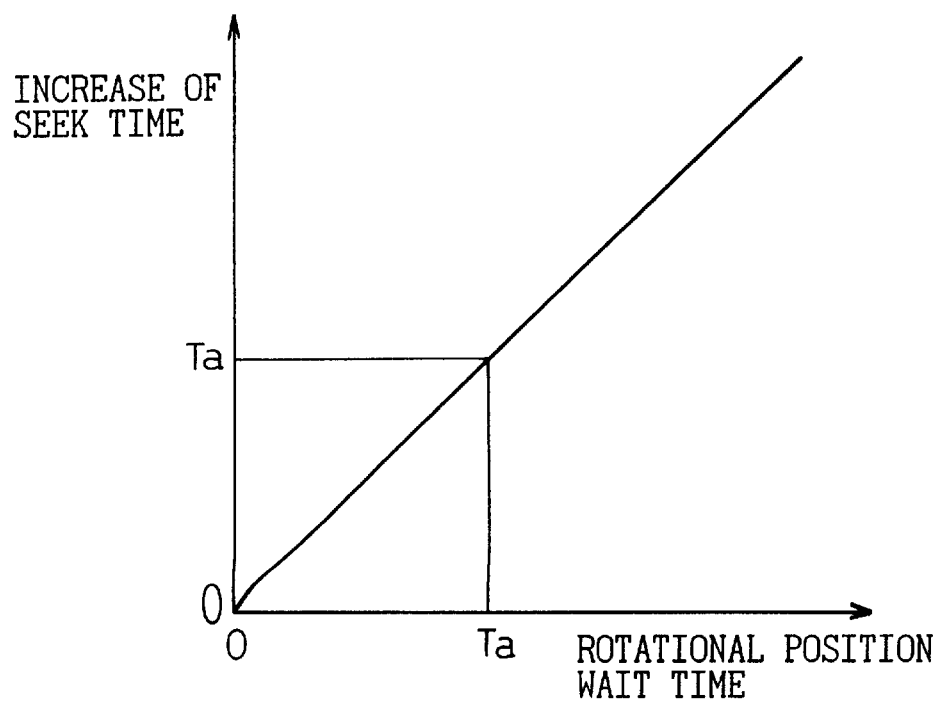
FIG. 12 is a graph illustrating the relationship between a rotation wait time and an increase in seek time.

An actual seek time needed to change heads and then move a new head to a target track is calculated by adding a rotation wait time preceding a seek time to the seek time needed to track a target track after changing heads. The seek time including the rotation wait time must be minimized. An increase in seek time caused by a rotation wait is, as shown in FIG. 12, simply proportional to the length of a rotation wait time. That is to say, when a rotation wait time is Ta, the seek time increases by the time Ta.

Figure 13:
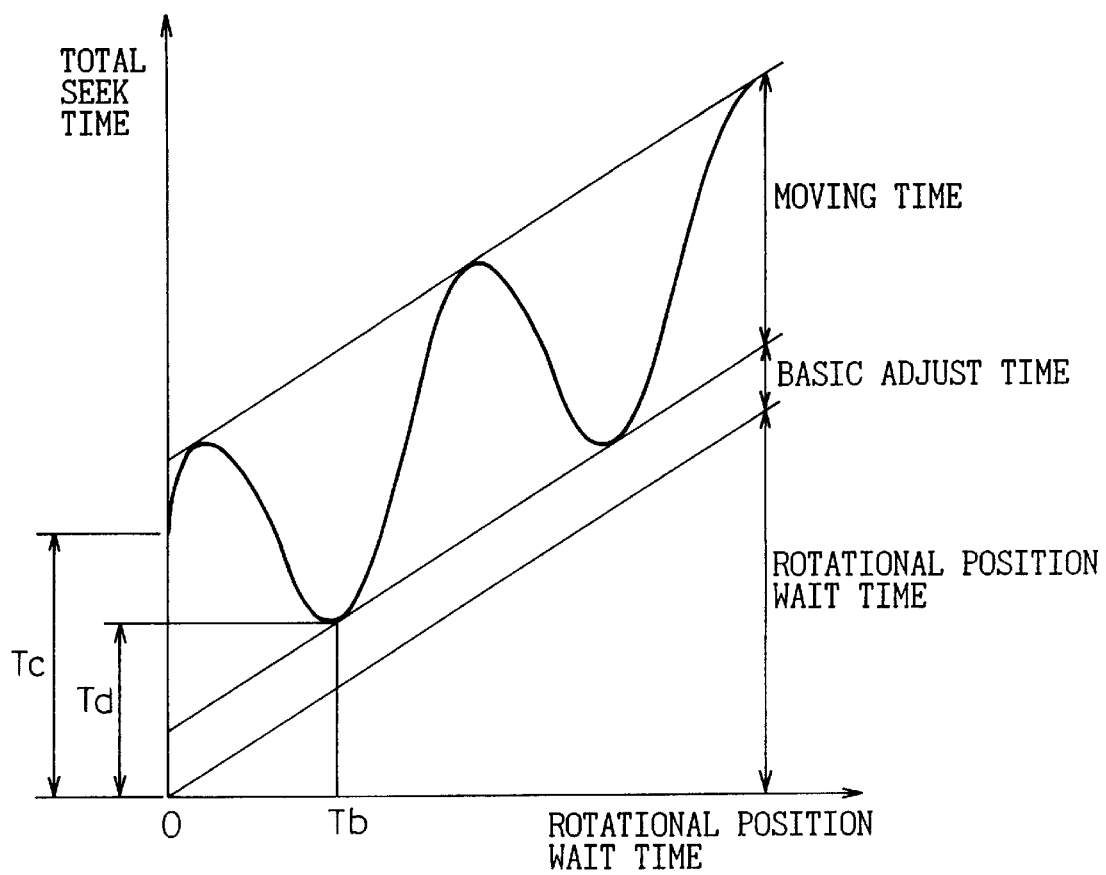
FIG. 13 is a graph illustrating a variation in seek distance due to an eccentricity and a variation in seek time plus rotation wait time.

Referring to FIGS. 10 and 11 in combination, a curve of an access time versus a rotation wait time and a variation in seek time deriving from a difference between eccentricities is plotted as shown in FIG. 13. The graph indicates a total seek time needed to control a current head so that the current head can track a track for a certain specified time, and then to carry out seek by changing heads when a certain specified time has elapsed. For example, immediately after time instant 0, that is, after a seek instruction that instructs seek as well as changing of heads is received, when seek is started by changing heads, a seek time Tc is needed. However, after the current head is retained for time Tb, when seek is started by changing the head to another, only time Td is needed. Herein, a rotation wait time is included in time Td. Access can be gained during a shorter time than time Tc.

As mentioned above, when a difference between eccentricities associated with heads, the relationship between a seek distance and seek time are taken into consideration and a rotation wait time, at what time instant changing heads should be carried out in order to achieve seek for the shortest time can be determined.

In the foregoing case, the seek distance is always positive (or negative). When there is a possibility that the seek distance may have both positive and negative values, the relationship illustrated in FIG. 11 can be used to define conditions for achieving seek for the shortest time.

In the foregoing case, a head is merely moved from one track to another. Another case in which a target sector of a target track corresponding to a target address should be accessed for the shortest time will be described below. An access time required for changing heads and moving a new head to a target address is calculated by adding a rotation wait time required for accessing a target sector after completion of seek to a seek time required for tracking a target track after changing heads. In reality, what is counted is the access time that should be minimized.

Figure 14:
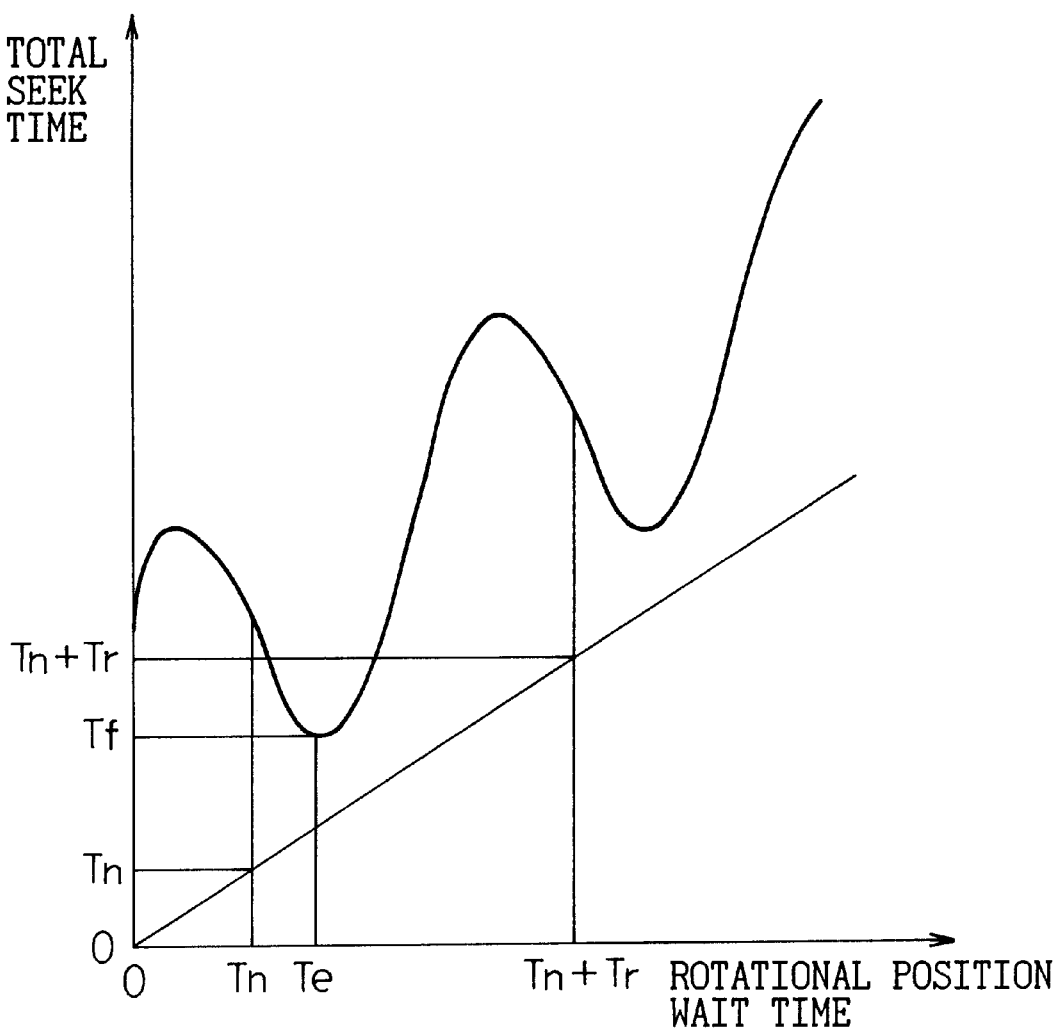
FIG. 14 is a graph illustrating a variation in seek distance due to an eccentricity, a variation in seek time plus rotation wait time, and a variation in access time plus rotation wait time ending at the time instant at which a target sector comes along.

FIG. 14 is a graph for explaining a seek movement that helps minimize an access time. In FIG. 14, assuming that a time between time instant 0, that is, the time instant at which a seek instruction instructing a seek as well as changing of heads is received and the time instant at which a target sector comes along is Tn, the target sector comes next in time Tn+Tr or in a wait time corresponding to one rotation, and comes further next in time Tn+2Tr or in a wait time corresponding to two rotations. In the example of FIG. 14, seek will never be completed by time instant Tn. In any case, a wait time corresponding to one rotation is needed. When heads are changed in a wait time ending at time instant Te, seek is completed by time instant Tf. Since time Tf is shorter than time Tn+Tr, an access time is Tn+Tr. However, when seek is started at time instant 0, a time equal to or longer than Tn+Tr is needed to complete seek. It is required to wait until the target sector comes next or two rotations are made. The access time becomes Tn+2Tr. In the illustrated example, it is preferable to start a seek at time instant Te.

In reality, the conditions for minimizing an access time include the conditions under which a seek start time instant can be changed. As long as the access time can be minimized, there is no particular problem. Seek can be started at any time instant under the conditions. However, it is preferable in terms of control that the seek start time instant is determined in order to minimize a seek time.

There are still various kinds of optimal processing for changing heads. In particular, when a current track and target track cross each other, heads can be changed without a seek movement. An example of optimal processing to be carried out when a current track and target track are crossing each other will be described below.

Figure 15:
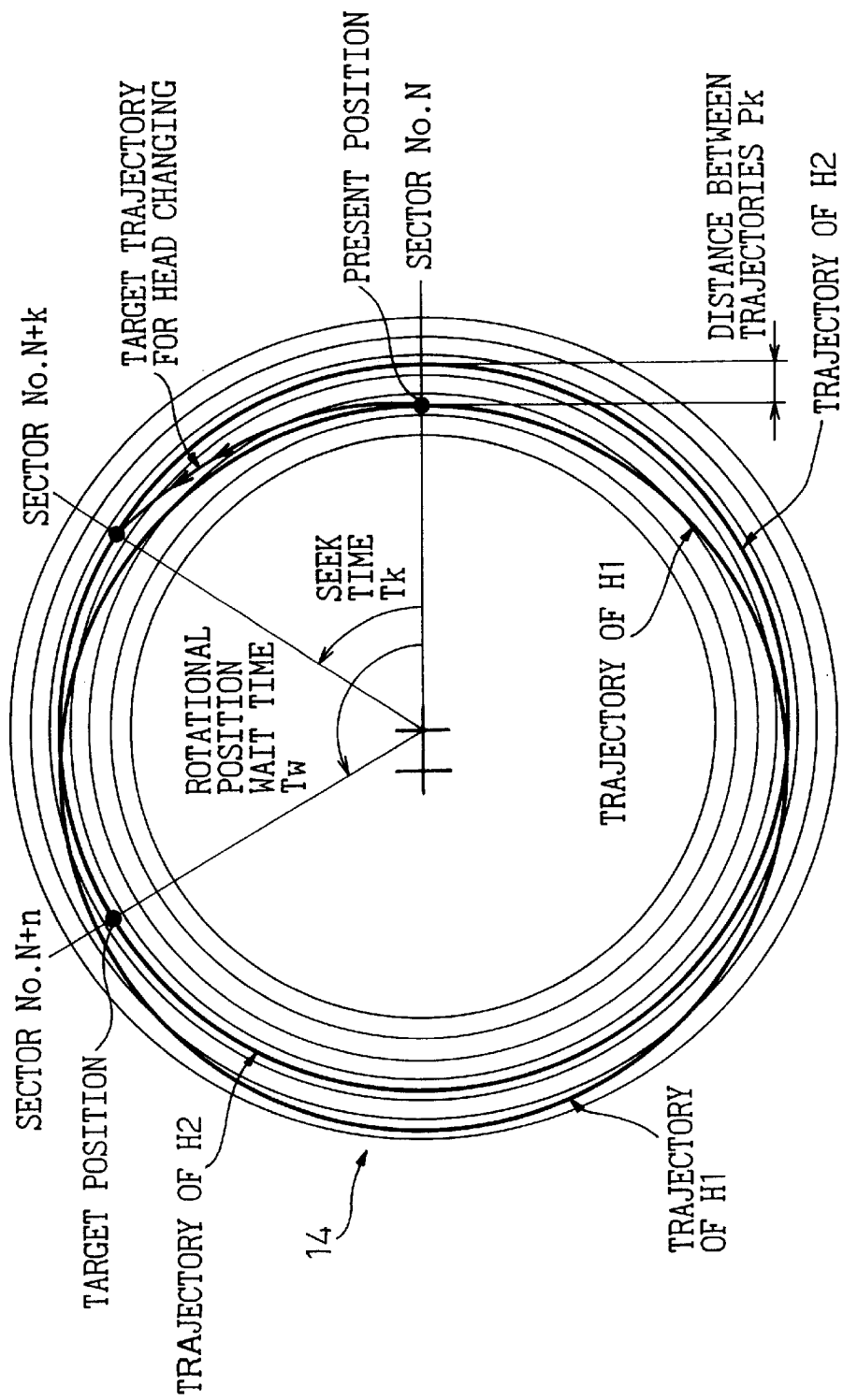
FIG. 15 is a diagram for explaining a seek movement to be made when a current track and target track are crossing each other.

FIG. 15 is a diagram for explaining a head change movement to be made when a current track and target track are crossing each other. FIG. 15 shows a model of a target trajectory to be traced during a seek movement accompanied by changing of heads on eccentric disks.

Assume that the trajectory of current head H1 and that of target head H2, as illustrated, cross each other. When head H1 is located in a sector of sector number N of a track shown in FIG. 15, it is instructed that head H2 should access a target position of sector number N+n of a track having the same track number. A distance Pk between the two trajectories created when seek is instructed is calculated. A seek time Tk is needed to seek the track and move over the distance Pk, and the disks rotate by k sectors during the seek time. Under these circumstances, if a seek is started immediately, the seek would be completed at the position of sector number N+k. If the sector number N+n of a target sector is larger than N+k, that is, if the n value is larger than the k value, after head H2 seeks the track, a standby state is retained while head H2 is tracking the track from sector N+k to sector N+n. Access to the target position is therefore completed in a rotation wait time during which a rotation corresponding to sectors n is made. If N+n is smaller than N+k, when head H2 seeks the track, the target sector has already passed. It is therefore necessary to retain a standby state until a rotation is made to bring back the target sector. In this case, therefore, access to the target position is completed in a time calculated by adding the time required for one rotation to the rotation wait time during which a rotation corresponding to n sectors is made.

As shown in FIG. 15, the current track and target track may cross each other during the rotation made to bring back the target sector. In this case, heads are changed at the position of crossing. The head can then track the target track nearly instantaneously without a seek movement. Moreover, after the heads are changed, a rotation is made to bring back the target sector. The access time will therefore not be prolonged.

Figure 16:
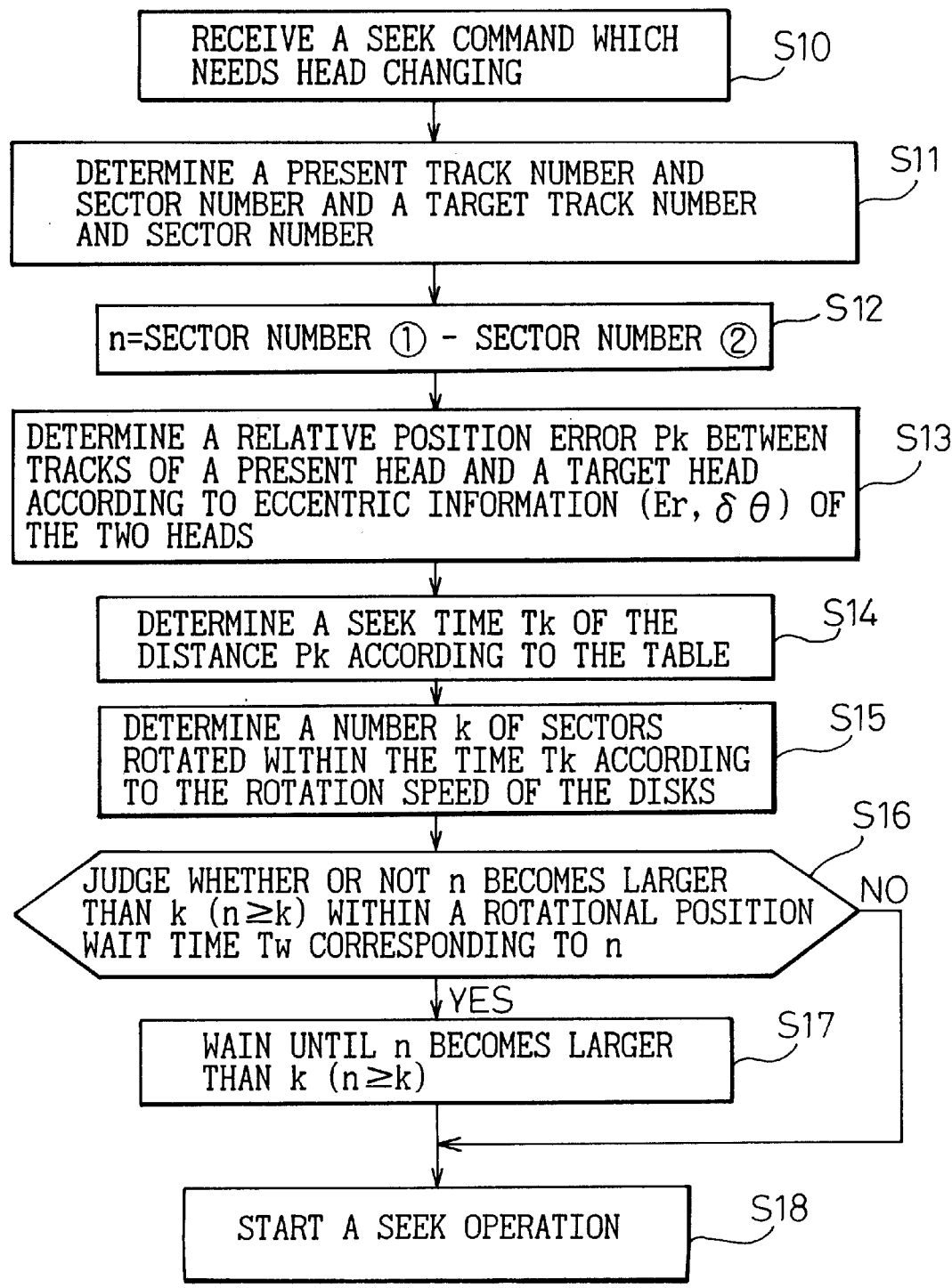
FIG. 16 is a flowchart describing seek to be executed when a current track and target track are crossing each other.

FIG. 16 is a flowchart describing a control sequence for a seek movement in the embodiment.

Assume that a seek instruction for instructing a seek as well as changing of object heads is received at step S10. At step S11, the track number and sector number of a track and sector on which a head is located at that time, and the track number and sector number of a target track and sector serving as a seek destination are determined. At step S12, a difference n between the present sector and target sector is calculated. At step S13, a relative positional error Pk between the present track and target track is determined on the basis of the difference between the present track and target track as well as eccentric information concerning two heads, that is, the present and target disk record surfaces, such as, magnitudes of eccentricities Er and directions of eccentricities δθ with respect to the direction of the first sector that is 0°. At step S14, a time Tk required to seek to the target track over a distance equivalent to the relative positional error Pk is determined using the physical address-logical address converting table 42. At step S15, the number of sectors, k, over which the head moves with rotation of the disk within time Tk is determined. At step S16, it is judged whether or not the present track and target track cross each other for a rotation wait time Tw equivalent to n sectors. The term "crossing" means that two tracks cross each other when they are seen in the direction of the axis of rotation of the spindle motor. When two tracks cross each other, the relative position error Pk is set to zero at step S17. A standby state is retained until the two tracks cross each other. When the tracks cross each other, a seek movement for changing heads is carried out at step S18. In this case, during the seek movement, changing heads is solely carried out because a new head has already been placed on the target track. When the tracks do not cross each other, control is passed to step S18. A seek movement is carried out to cancel out the calculated relative position error Pk. After the head is controlled to track the target track, a standby state is retained until the target sector comes along.

Figure 17:
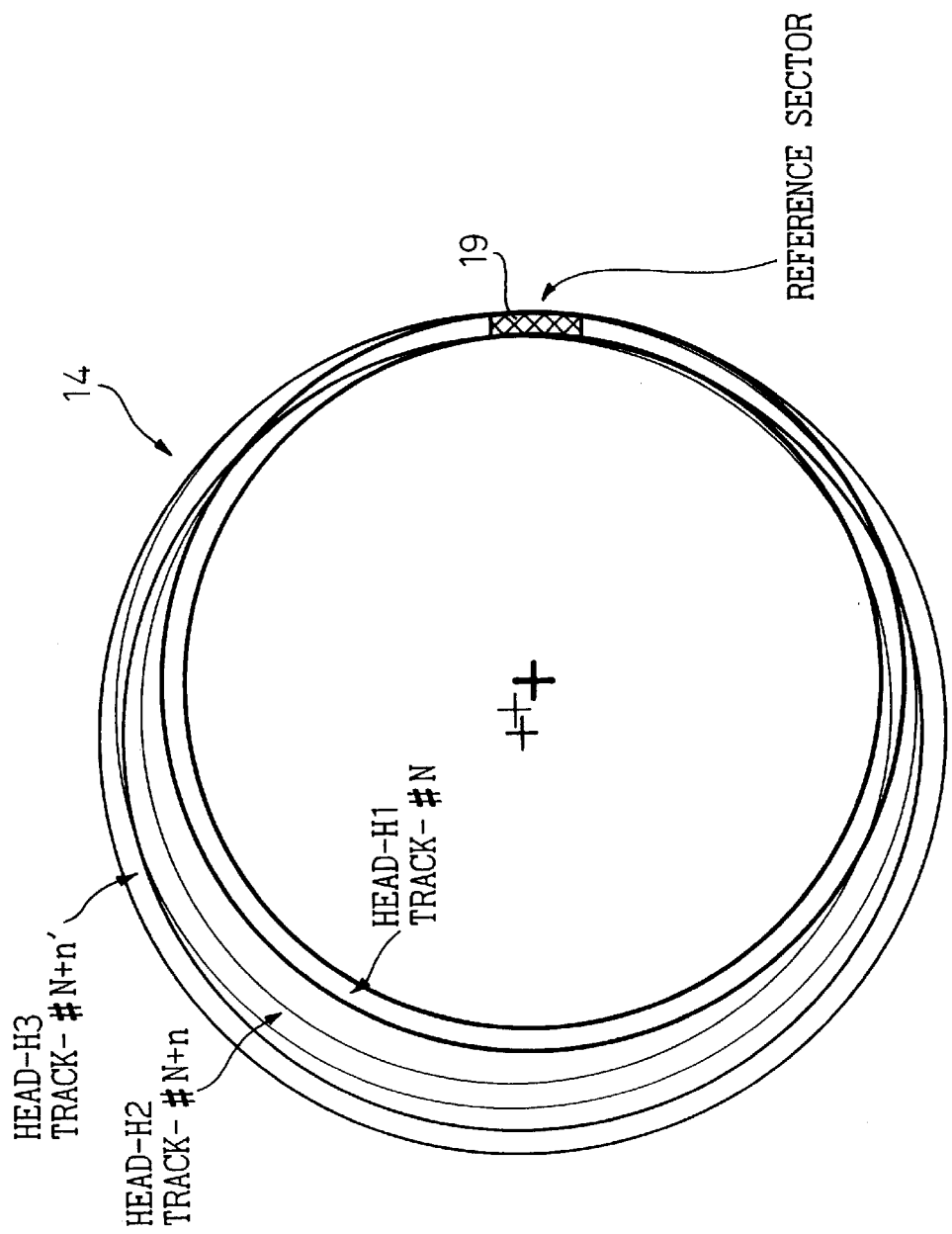
FIG. 17 is a diagram for explaining allocation of physical addresses and logical addresses in an embodiment.

Next, an example of allocating addresses using the physical address-logical address converting table 40d will be described. FIG. 17 is a diagram for explaining allocation of addresses in this embodiment.

When disks on which servo-control circular trajectories are formed externally by an STW are assembled as they are in this embodiment, eccentricities occur. For this reason, if consecutive logical addresses are allocated orderly to tracks having the same track number on disk surfaces as they are in the prior art, a seek movement becomes indispensable at the time of changing heads. In this embodiment, as shown in FIG. 17, one of a plurality of disk record surfaces, for example, a first disk surface, is regarded as a reference surface. A head for reading or writing data from or on the first disk surface is head H1. Take for instance a certain sector 19 of an N-th track #N on the first disk surface, for example, the 0-th sector. The other disk surfaces are all eccentric in a different manner from the first disk surface. When the disk surfaces are seen in the direction of the axis of rotation, a track on any other disk surface located at the same position as the 0-th sector 19 of track #N on the first disk surface is not the N-th track. However, the eccentricities are not very large. There is a sector of a track located at the same position as the 0-th sector 19 of track #N on the first disk surface. As for the accuracy in the disk assembly, the accuracy at an angular position in a circumferential direction is much lower than that in the width direction of a sector. For this reason, the sector can be considered as the 0-th sector. This means that there is a track whose 0-th sector is located at the same position as the 0-th sector 19 of track #N on the first disk surface. In the drawing, the N+n-th track on the second disk surface and the N+n'-th track on the third disk surface pass the position of the 0-th sector 19 of track #N on the first disk surface. In this embodiment, modified track numbers are assigned to tracks in such a way that modified number N is assigned to the N+n-th track on the second disk and the N+n'-th track on the third disk surface respectively. Thereafter, the consecutive logical addresses are allocated orderly to tracks having the same track number on disk surfaces in the same manner as they are in the prior art. Thus, when heads are changed at a given sector (0-th sector), a seek movement of a new head required because of a difference between eccentricities at the time of changing heads need not be carried out in the course of writing or reading of data on or from consecutive logical tracks. Consequently, fast access is realized.

As described so far, according to the present invention, there is provided a head positioning control system and control method for disk drives. Even if tracks defined with servo control information are eccentric relative to the center of rotation, fast access can be achieved. Even when a rotational trajectory becomes eccentric because of a deviation of the attached position of a head from others, fast access can be realized according to the present invention.

What is claimed is:

1. A head positioning control system for disk drives comprising a detector for generating a head position servo control information stored on the surfaces of disks and read by the heads, and a controller for generating a head position control signal used to move the heads, and controlling the head so that the corresponding head can track a given track on a disk record surface and can be located at a position on a track corresponding to an instructed target address, wherein said servo control information includes position information in a radial direction on each disk record surface and defines servo-control circular trajectories, said head positioning control system comprising:

a memory for storing eccentric information concerning eccentricities of said servo-control circular trajectories on disk record surfaces relative to the center of rotation, wherein said eccentric information includes information related to whether the rotational trajectory of one track crosses the rotational trajectory of another track; and an optimal processing means that when object disk record surfaces are changed according to an instructed target address, executes processing which provides the shortest time for accessing a target address, on the basis of said eccentric information.

2. A head positioning control system according to claim 1, wherein said optimal processing means executes processing which provides the shortest time for accessing a target address, and also provides the shortest time as a seek time needed to track a target track corresponding to the target address after quitting a current track that is tracked when the target address is instructed, as optimal processing.

3. A head positioning control system according to claim 2, further comprising a head change information detecting means for detecting eccentric information concerning rotational trajectories on a plurality of disk record surfaces.

4. A head positioning control system according to claim 3, further comprising a means for outputting a target track number and sector number corresponding to the target address, wherein said means includes a physical address/logical address table in which one of a plurality of disk record surfaces is regarded as a reference surface, tracks on other disk record surfaces which cross given sectors of tracks on the reference surface are provided with the same physical track numbers as the corresponding tracks on the reference surface, and consecutive logical track numbers are allocated to the tracks having the same physical track numbers.

5. A head positioning control system according to claim 2, further comprising a means for outputting a target track number and sector number corresponding to the target address, wherein said means includes a physical address/logical address table in which one of a plurality of disk record surfaces is regarded as a reference surface, tracks on other disk record surfaces which cross given sectors of tracks on the reference surface are provided with the same physical track numbers as the corresponding tracks on the reference surface, and consecutive logical track numbers are allocated to the tracks having the same physical track numbers.

6. A head positioning control system according to claim 1, further comprising a head change information detecting means for detecting eccentric information concerning rotational trajectories on a plurality of disk record surfaces.

7. A head positioning control system according to claim 6, further comprising a means for outputting a target track number and sector number corresponding to the target address, wherein said means includes a physical address/logical address table in which one of a plurality of disk record surfaces is regarded as a reference surface, tracks on other disk record surfaces which cross given sectors of tracks on the reference surface are provided with the same physical track numbers as the corresponding tracks on the reference surface, and consecutive logical track numbers are allocated to the tracks having the same physical track numbers.

8. A head positioning control system according to claim 1, further comprising a means for outputting a target track number and sector number corresponding to the target address, wherein said means includes a physical address/logical address table in which one of a plurality of disk record surfaces is regarded as a reference surface, tracks on other disk record surfaces which cross given sectors of tracks on the reference surface are provided with the same physical track numbers as the corresponding tracks on the reference surface, and consecutive logical track numbers are allocated to the tracks having the same physical track numbers.

9. A head positioning control system for disk drives comprising a detector for generating a head position servo control information stored on the surfaces of disks and read by the heads, and a controller for generating a head position control signal used to move the heads, and controlling the head so that the corresponding head can track a given track on a disk record surface and can be located at a position on a track corresponding to an instructed target address, wherein said servo control information includes position information in a radial direction on each disk record surface and defines servo-control circular trajectories, said head positioning control system comprising:

a memory for storing eccentric information concerning eccentricities of said servo-control circular trajectories on disk record surfaces relative to the center of rotation; and an optimal processing means that when object disk record surfaces are changed according to an instructed target address, executes processing which provides the shortest time for accessing a target address, on the basis of said eccentric information, wherein said optimal processing means judges whether or not the rotational trajectory of a current track that is tracked when the target address is instructed crosses the rotational trajectory of a target track corresponding to the target address; when the tracks cross each other, said optimal processing means judges whether or not the tracks cross each other within a rotation wait time needed to access a sector of the track corresponding to the target address for the first time; if the tracks do not cross each other, said optimal processing means judges whether or not the target track can be sought within the rotation wait time; if the target track can be sought, said optimal processing means determines processing of seeking the target track as optimal processing immediately; in any other case, said optimal processing means determines processing which causes a head to keep tracking the current track until the two tracks cross each other and which, when the tracks cross each other, causes the head to track the target track, as optimal processing.

10. A head positioning control system according to claim 9, further comprising a head change information detecting means for detecting eccentric information concerning rotational trajectories on a plurality of disk record surfaces.

11. A head positioning control system according to claim 10, further comprising a means for outputting a target track number and sector number corresponding to the target address, wherein said means includes a physical address/ logical address table in which one of a plurality of disk record surfaces is regarded as a reference surface, tracks on other disk record surfaces which cross given sectors of tracks on the reference surface are provided with the same physical track numbers as the corresponding tracks on the reference surface, and consecutive logical track numbers are allocated to the tracks having the same physical track numbers.

12. A head positioning control system according to claim 9, further comprising a means for outputting a target track number and sector number corresponding to the target address, wherein said means includes a physical address/logical address table in which one of a plurality of disk record surfaces is regarded as a reference surface, tracks on other disk record surfaces which cross given sectors of tracks on the reference surface are provided with the same physical track numbers as the corresponding tracks on the reference surface, and consecutive logical track numbers are allocated to the tracks having the same physical track numbers.

13. A magnetic disk drive, comprising:
   a plurality of disks each having a record surface on which servo control information indicating positions in a radial direction on a disk is recorded;

heads associated with said plurality of disk record surfaces and designed to detect said servo control information recorded on said plurality of disk record surfaces;

a head positioning mechanism for positioning said heads with respect to said plurality of disks;

a detector for generating a head position value from the servo control information detected by the head;

an eccentric information storing means for storing eccentric information concerning eccentricities of servo-control circular trajectories on the disk record surfaces, which are defined with said servo control information, relative to the center of rotation, wherein said eccentric information includes information related to whether the rotational trajectory of one track crosses the rotational trajectory of another track; and an optimal processing means that, when object disk record surfaces are changed according to an instructed target address, executes processing, which provides the shortest time for accessing a target address, on the basis of said eccentric information.

* * * * *